(12) United States Patent
Yamada et al.

(10) Patent No.: US 9,212,943 B2
(45) Date of Patent: Dec. 15, 2015

(54) ULTRASONIC REACTOR WATER LEVEL MEASURING DEVICE AND EVALUATION METHOD

(71) Applicant: Hitachi-GE Nuclear Energy, Ltd., Hitachi-shi, Ibaraki (JP)

(72) Inventors: Izumi Yamada, Tokai (JP); Atsushi Fushimi, Hitachi (JP); Atsushi Baba, Tokai (JP); Akira Murata, Hitachi (JP); Tamotsu Asano, Hitachi (JP); Ryuta Hama, Hitachi (JP); Mikio Koyama, Hitachi (JP); Hiroaki Katsuyama, Hitachi (JP); Yoshinori Musha, Hitachiota (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 300 days.

(21) Appl. No.: 13/728,983

(22) Filed: Dec. 27, 2012

(65) Prior Publication Data

US 2013/0174637 A1  Jul. 11, 2013

(30) Foreign Application Priority Data

Jan. 5, 2012 (JP) .................................. 2012-000819

(51) Int. Cl.
*G01F 25/00* (2006.01)
*G01F 23/296* (2006.01)
*G21C 17/035* (2006.01)

(52) U.S. Cl.
CPC ........ *G01F 23/2962* (2013.01); *G01F 25/0061* (2013.01); *G01F 25/0076* (2013.01); *G21C 17/035* (2013.01)

(58) Field of Classification Search
CPC .. G01F 25/0061; G01F 23/266; G01F 23/284

USPC ..................................... 73/1.73, 290 V, 290 R
See application file for complete search history.

(56) References Cited

U.S. PATENT DOCUMENTS 3,214,974 A    11/1965 Altman et al.
3,828,609 A *   8/1974 Furon et al. ..................... 73/622
(Continued)

FOREIGN PATENT DOCUMENTS

JP    58-42793 U    3/1983
JP    1-162632 U   11/1989
(Continued)

OTHER PUBLICATIONS

Japanese Office Action dated Jul. 28, 2015 (four pages).
(Continued)

*Primary Examiner* — Hezron E Williams
*Assistant Examiner* — Rodney T Frank
(74) *Attorney, Agent, or Firm* — Crowell & Moring LLP

(57) ABSTRACT

An ultrasonic reactor water level measuring device and an evaluation method are provided and prevent a reduction in the measurement accuracy of a water level that is in a wide measurement range. The ultrasonic reactor water level measuring device includes an upper tube extending from a gas phase portion in a reactor, a lower tube extending from a liquid phase portion in the reactor, measurement tubes connected to each other and arranged at multiple stages between the upper tube and the lower tube, and units for generating and receiving ultrasonic waves, the units being arranged at bottom portions of the measurement tubes. The ultrasonic reactor water level measuring device measures levels of water within the measurement tubes and calculates a water level within the reactor from the sum of the measured water levels, the sum excluding an overlapped part of the measurement tubes.

7 Claims, 4 Drawing Sheets

(56) References Cited

U.S. PATENT DOCUMENTS

| | | | |
|---|---|---|---|
| 4,056,434 A | 11/1977 | Barnes et al. | |
| 5,038,611 A | 8/1991 | Weldon et al. | |

FOREIGN PATENT DOCUMENTS

| JP | 3-289520 A | 12/1991 |
|---|---|---|
| JP | 5-273033 A | 10/1993 |
| JP | 8-105784 A | 4/1996 |
| JP | 8-226843 A | 9/1996 |
| JP | 2918126 B2 | 7/1999 |
| JP | 2001-272266 A | 10/2001 |
| JP | 2009-53105 A | 3/2009 |
| JP | 2009-281729 A | 12/2009 |
| JP | 2010-276593 A | 12/2010 |
| JP | 2011-180052 A | 9/2011 |

OTHER PUBLICATIONS

English abstract of document B5 (JP 58-42793 U) previously filed on Aug. 25, 2015 (one page).
English abstract of document B6 (JP 1-162632 U) previously filed on Aug. 25, 2015 (two pages).

* cited by examiner

A - A'

ULTRASONIC REACTOR WATER LEVEL MEASURING DEVICE AND EVALUATION METHOD

BACKGROUND OF THE INVENTION

1. Field of the Invention

The present invention relates to an ultrasonic reactor water level measuring device that uses ultrasonic waves to measure a water level of a reactor such as a boiling water reactor. The invention also relates to a method for evaluating the soundness of the ultrasonic reactor water level measuring device.

2. Description of the Related Art

An ultrasonic water level meter that includes an ultrasonic probe, a time meter and a water level calculator is known in the art. The ultrasonic probe transmits an ultrasonic signal into a fluid. The time meter measures a propagation time between the transmission of the ultrasonic signal to the surface of the fluid within a waveguide, and return of the ultrasonic signal from the surface of the fluid. The water level calculator calculates a water level on the basis of the propagation time and executes temperature compensation. Since the propagation time is a round-trip propagation time, the propagation time is converted into a one-way trip propagation time. The water level is calculated by multiplying the one-way trip propagation time by the speed of a sound within water with a compensated temperature (for example, JP-2011-180052-A).

SUMMARY OF THE INVENTION

In the ultrasonic water level meter described in JP-2011-180052-A, an upper tube extends from a gas-phase portion in a reactor vessel, and a lower tube extends from a liquid-phase portion in the reactor vessel. Liquid surface formation tubes are connected to the upper and lower tubes and located between the upper and lower tubes. These three tubes are collectively referred to as a measurement tube. The ultrasonic water level meter includes an ultrasonic wave transducer, an ultrasonic signal transducer, a waveform storage unit and a liquid level calculator. The ultrasonic wave transducer is attached to an outer wall surface of a lower portion of the measurement tube. The ultrasonic wave transducer transmits an ultrasonic wave to a liquid-phase portion included in the measurement tube on the basis of a transmission electric signal. The ultrasonic wave transducer receives an ultrasonic wave reflected from a liquid surface within the liquid surface formation tube and converts the received reflected ultrasonic wave into a reflected wave electric signal. The ultrasonic signal transducer transmits the transmission electric signal to the ultrasonic wave transducer and receives the reflected wave electric signal corresponding to the reflected ultrasonic wave from the ultrasonic wave transducer. The waveform storage unit stores, as a standard waveform, an envelope curve of a waveform of the reflected wave electric signal corresponding to the ultrasonic wave reflected in a state in which the liquid surface formed in the liquid surface formation tube is stable. The liquid level calculator calculates a correlation value of the envelope curve of the waveform of the reflected wave electric signal and the standard waveform stored in the waveform storage unit, thereby detects, from the waveform of the reflected wave electric signal, the wave reflected from the liquid surface within the liquid surface formation tube, and calculates a liquid level from a propagation time of the ultrasonic wave reflected from the liquid surface.

In some cases, a measurement range of the level of water in an actual reactor vessel may exceed 15 meters. The energy of an ultrasonic wave may attenuate due to a change to thermal energy during propagation of the ultrasonic wave in the water or due to an increase in a propagation time of the ultrasonic wave. In both cases, the longer a propagation distance, the larger the amount of the attenuation. As a result, an SN ratio in the water level measurement is degraded. Conventionally, an envelope signal of a wave reflected from a liquid surface is stored in advance for the purpose of selectively extracting the wave reflected from the liquid surface, a correlation between the stored envelope signal and an actually measured envelope signal is obtained, and whereby an SN ratio is improved. Since an ultrasonic wave signal is converted into a low-frequency signal in order to obtain the envelope signal, the resolution of the water level measurement may be reduced. As a result, the accuracy of the measurement may be reduced.

An object of the invention is to provide an ultrasonic reactor water level measuring device and an evaluation method that do not reduce the accuracy of measurement of a water level in a wide measurement range.

In order to accomplish the aforementioned object, in an ultrasonic reactor water level measuring device, a plurality of measurement tubes are arranged at multiple stages. The measurement tubes are shorter than conventional measurement tubes. Thus, the amounts of attenuation of ultrasonic waves can be small and SN ratios are not largely reduced. An envelope signal, therefore, is not necessary, unlike conventional methods. A distance resolution of the water level measuring device is determined by the original frequencies of ultrasonic waves and can be maintained. Thus, the accuracy of the measurement of the water level can be improved, compared with conventional techniques. In addition, since pressure in a reactor pressure vessel is high and approximately 7 MPa during a rated operation, separation valves are arranged. If water vapor leaks from any of the measurement tubes, the separation valves are automatically closed so as to maintain the pressure in the reactor pressure vessel. The measurement tubes are arranged at the stages and overlap each other in a vertical direction. The water level measuring device calculates levels of water in the measurement tubes from periods of time for ultrasonic waves to reciprocate between ultrasonic probes and liquid surfaces and thereby calculates the sum of the levels of the water in the measurement tubes arranged at the stages, the sum excluding the total height of overlapped parts of the measurement tubes. The temperatures of the insides of the measurement tubes and pressure within the measurement tubes may vary due to operational conditions and a change of the temperature of air existing outside the water level measuring device. In this case, the speed of a sound in water varies. Reflective plates are arranged at predetermined positions in the measurement tubes in order to compensate for the variation in the sound speed on the basis of propagation times of waves reflected from the reflective plates. If the soundness of the ultrasonic reactor water level measuring device can be confirmed from a central control room or the like for the water level measurement, the reliability of a measured value is improved. In the invention, in order to confirm the soundness of the ultrasonic reactor water level measuring device, the soundness of the ultrasonic reactor water level measuring device can be determined by determining whether or not ultrasonic waves are transmitted into water, determining whether or not water exists in the measurement tubes and determining whether or not the electric pulse signals are received by the ultrasonic probes, and the like, on the basis of waveforms of the ultrasonic waves transmitted by the ultrasonic probes after application of the electric pulse signals to the ultrasonic probes arranged at the measurement tubes.

According to the invention, it is possible to improve the accuracy of the ultrasonic reactor water level measurement in which a wide measurement range of the water level needs to be covered.

DESCRIPTION OF THE PREFERRED EMBODIMENTS

Embodiments of an ultrasonic reactor water level measuring device according to the invention are described below with reference to the accompanying drawings.

First Embodiment

A first embodiment of the ultrasonic reactor water level measuring device according to the invention is described with reference to FIGS. 1 to 5.

Figure 1:
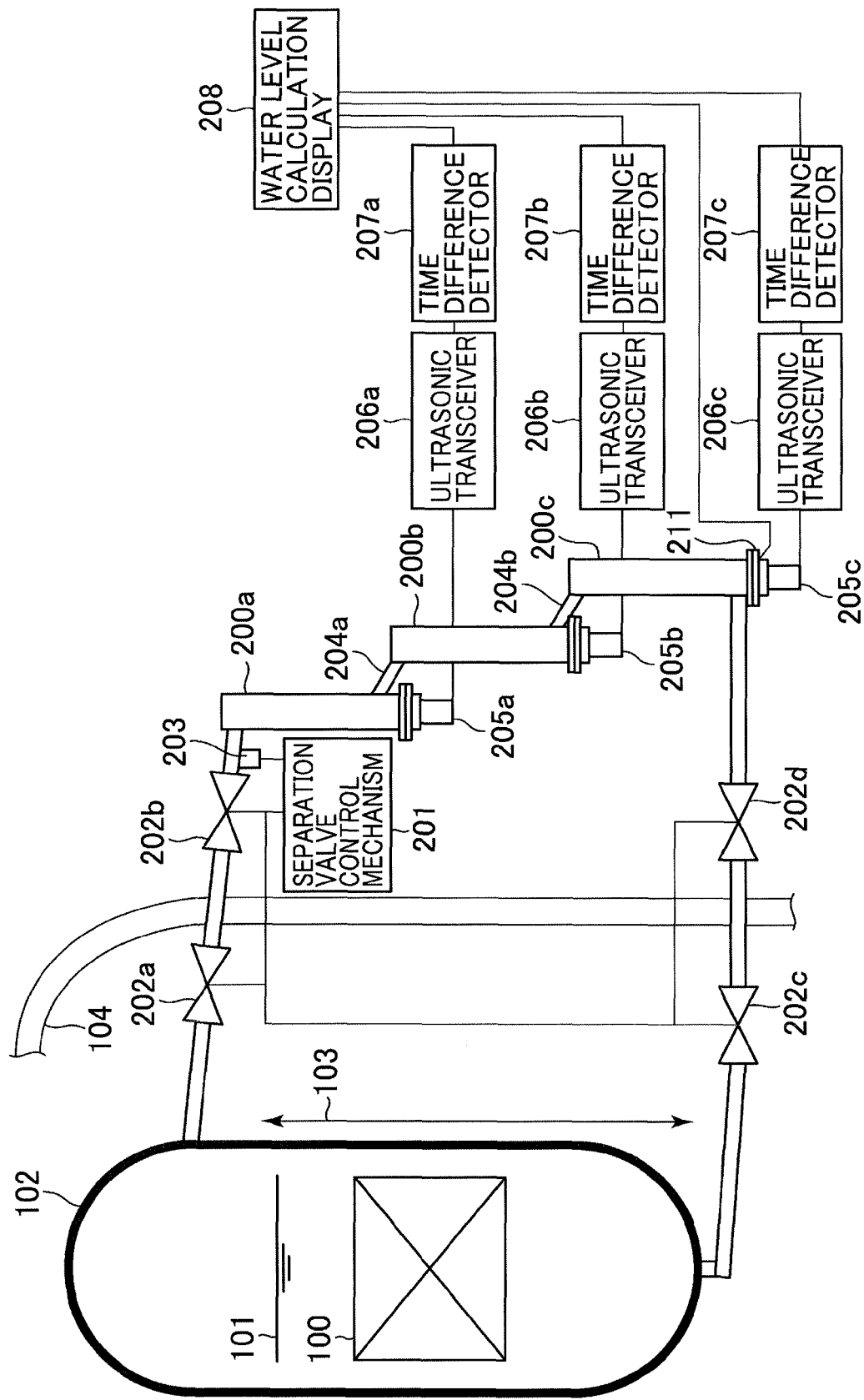
FIG. 1 is a schematic diagram illustrating a first embodiment of an ultrasonic reactor water level measuring device according to the invention.

FIG. 1 is a schematic diagram illustrating a case in which the ultrasonic reactor water level measuring device according to the invention is applied to a boiling water reactor.

A reactor core 100 made of a nuclear fuel is stored in a reactor pressure vessel 102, while a water level 101 is a vertical position of the surface of a coolant within the reactor pressure vessel 102. A water level measurement range 103 is from a lower portion of the reactor pressure vessel 102 to a level located near a separator (not illustrated). Since water level measurement tubes 200a, 200b and 200c are arranged outside the reactor pressure vessel 102, a person can approach the water level measurement tubes 200a, 200b and 200c even when the reactor operates. A tube is connected between an upper portion of the reactor pressure vessel 102 and an upper portion of the water level measurement tube 200a through separation valves 202a and 202b. In addition, another tube is connected between the lower portion of the reactor pressure vessel 102 and a lower portion of the water level measurement tube 200c through separation valves 202c and 202d. A separation valve control mechanism 201 automatically closes the separation valves 202a, 202b, 202c and 202d when the pressure value detected by a pressure sensor 203 is equal to or lower than a set value. The water level measurement tubes 200a and 200b are connected to each other through a connection tube 204a, while the water level measurement tubes 200b and 200c are connected to each other through a connection tube 204b. Ultrasonic probes 205a, 205b and 205c are arranged at lower portions of the water level measurement tubes 200a, 200b and 200c, respectively. Ultrasonic transducers 206a, 206b and 206c apply electric pulse signals to the ultrasonic probes 205a, 205b and 205c, respectively, and whereby the ultrasonic probes 205a, 205b and 205c transmit ultrasonic waves toward upper portions of the water level measurement tubes 200a, 200b and 200c, respectively. The ultrasonic transducers 206a, 206b and 206c receive waves reflected from liquid surfaces or upper end portions of the water level measurement tubes 200a, 200b and 200c. Time difference detectors 207a, 207b and 207c detect differences between times when the electric pulse signals are applied and times when the reflected waves are received. A water level calculation display 208 calculates and displays the water level 101 on the basis of the sum of the time differences detected by the time difference detectors 207a, 207b and 207c. A temperature sensor 211 is inserted in the water level measurement tube 200c. The temperature sensor 211 is used to measure water temperature or temperature in the vicinity of the ultrasonic probe 205c and correct a sound speed as described later.

Figure 2:
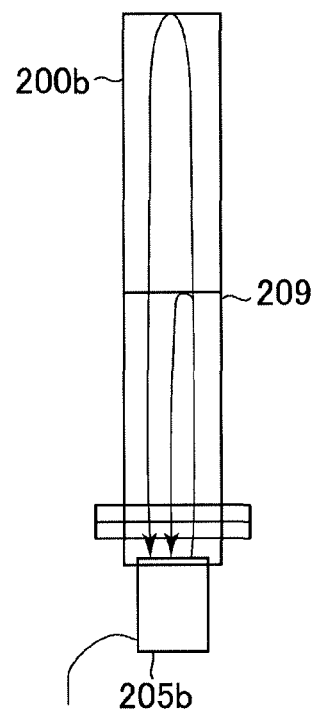
FIG. 2 is a diagram illustrating a path for propagation of an ultrasonic wave in a measurement tube to which an ultrasonic probe is attached.

FIG. 2 is a diagram describing propagation of an ultrasonic beam in the water level measurement tube 200b.

The water level measurement tube 200b includes a lower-portion flange and an upper tube. The lower-portion flange has an integral structure formed by welding the ultrasonic probe 205 and a flange together. The upper tube includes the flange. In FIG. 2, the connection tubes 204a and 204b are omitted. A reflective plate 209b is arranged in the middle of the water level measurement tube 200b. An example in which the water level measurement tube 200b is filled with water is described below. An ultrasonic wave is transmitted into the liquid by the ultrasonic probe 205b attached to the lower-portion flange. Then, part of the ultrasonic wave is reflected by the reflective plate 209b and returns to the ultrasonic probe 205b. A main component of the ultrasonic wave passes through the reflective plate 209b, is reflected from the upper end portion of the water level measurement tube 200b, and returns to the ultrasonic probe 205b.

Figure 3:
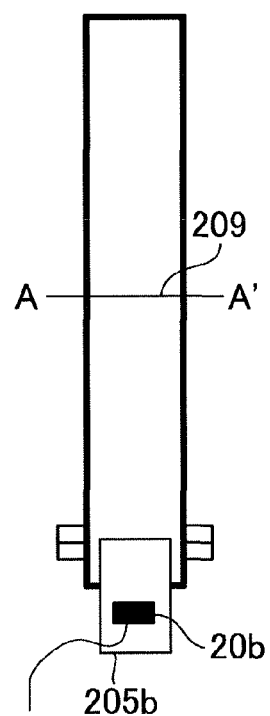
FIG. 3 is a cross-sectional view of the water level measurement tube to which the ultrasonic probe is attached.

FIG. 3 is a cross-sectional view of the water level measurement tube 200b that has the lower-portion flange formed by welding the ultrasonic probe 205b and the flange together.

An oscillator 20b is arranged in the ultrasonic probe 205b. The oscillator 20b is bonded to a case of the ultrasonic probe 205b. The ultrasonic wave is generated by the oscillator 20b and propagates from a bonding surface through a front surface wall of the case into the water. The reflective plate 209b is arranged in the middle of the water level measurement tube 200b. In the present embodiment, since a part of the ultrasonic probe 205b is located in the liquid, the ultrasonic wave can be efficiently transmitted into the liquid, compared with a case in which the ultrasonic probe 205b is pressed to a bottom portion of the water level measurement tube 200b through a couplant and arranged. If the ultrasonic wave can be efficiently transmitted in the liquid, the components that are contained in the ultrasonic wave generated by the oscillator 20b and are transmitted to a tube wall can be reduced. Thus, an effect of suppressing noise which includes he wave component transmitted to a tube can be expected.

Figure 4:
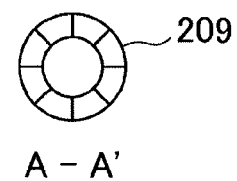
FIG. 4 is a diagram illustrating a structure of a reflective plate.

FIG. 4 is a cross-sectional view taken along a line A-A' of FIG. 3 and illustrates the shape of the reflective plate 209b arranged in the water level measurement tube 200b.

There is a tendency that the energy of a central portion of the ultrasonic wave that propagates in the water is high and the energy of an outer portion of the ultrasonic wave is low. The reflectance of the reflective plate 209b is adjusted by adjusting the shape of the reflective plate 209b to distinguish the amplitude of an ultrasonic wave reflected from the reflective plate 209b from the amplitude of an ultrasonic wave reflected from the upper end portion of the surface of the water. The shape of the reflective plate 209b is determined in advance on the basis of an experiment or a calculation. To increase the amplitude of the ultrasonic wave reflected from the liquid surface, the reflective plate 209b is configured so that an ultrasonic wave component passes through a central portion of the reflective plate 209b and reaches the liquid surface. On the other hand, an ultrasonic wave component reflected from an outer circumference of the reflective plate 209b is a main component of the ultrasonic wave reflected from the reflective plate 209b. The reflective plate 209b has a cylindrical supporting portion that extends from the outermost circumference of the reflective plate 209b and is fixed to a flange or an inner wall of the water level measurement tube 200b.

As described above, the two reflected wave components can be detected by the ultrasonic probe 205b. One of the reflected wave components is the wave reflected from the reflective plate 209b, while the other of the reflected wave components is the wave reflected from the liquid surface or the upper end portion of the water level measurement tube 200b. A time period from the generation of the reflected wave from the reflective plate 209b to reception of the reflected wave by the ultrasonic probe 205b is indicated by t1, while a time period from the reflection of the wave from the liquid surface or the upper end portion of the water level measurement tube 200b to reception of the reflected wave by the ultrasonic probe 205b is indicated by t2. A vertical position L2 of the liquid surface can be calculated using a vertical position L1 of the reflective plate 209b according to the following Equation (1).

$$L2 = (t2/t1) \times L1 \qquad (1)$$

The vertical position of the liquid surface may be lower than the vertical position of the reflective plate 209b. In this case, the same calculation is performed using a time period from reflection of a wave component from a reflective plate 209c arranged in the water level measurement tube 200c to reception of the wave component by the ultrasonic probe 205c. If the liquid surface does not reach the reflective plate 209c in the water level measurement tube 200c arranged in the lowermost stage, a sound speed cannot be corrected. Thus, water temperature or temperature in the vicinity of the ultrasonic probe 205c in the case where the liquid surface is lower than the reflective plate 209c can be corrected using the temperature sensor 211.

Figure 5:
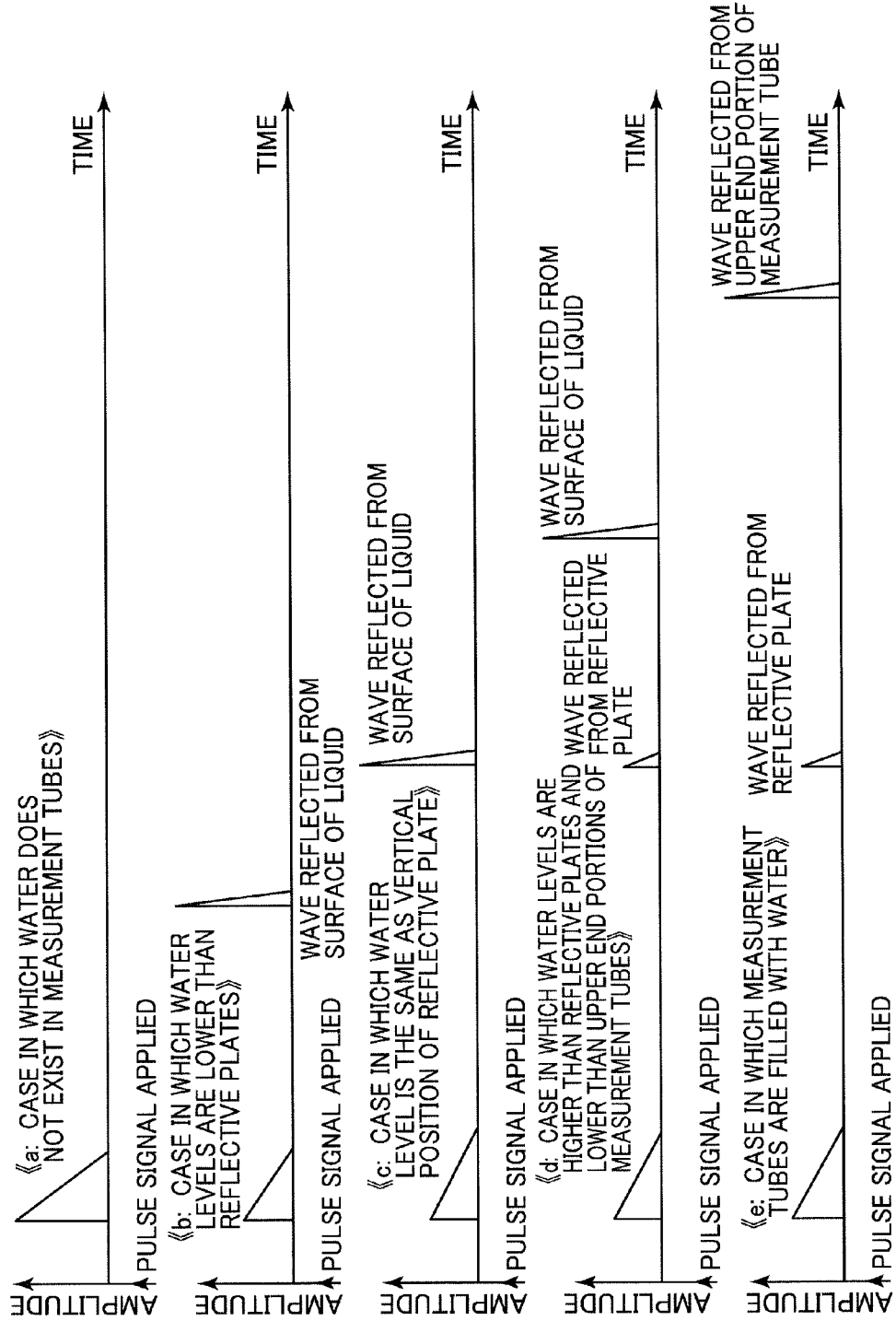
FIG. 5 is a diagram illustrating signals that are received by ultrasonic probes in various water level states.

FIG. 5 illustrates, as envelope signals, waveforms of waves received at times by the ultrasonic probes 205a, 205b and 205c.

In FIG. 5, "a" indicates a case in which water does not exist in the water level measurement tubes 200a, 200b and 200c. When the electric pulse signals are applied to the ultrasonic probes 205a, 205b and 205c, and the ultrasonic probes 205a, 205b and 205c are changed to reception states, signals with large amplitudes gradually attenuate with time. The signals indicate echoes of ultrasonic waves within the cases of the ultrasonic probes 205a, 205b and 205c and gradually attenuate with time. If water exists in the water level measurement tubes 200a, 200b and 200c, the energy of the ultrasonic waves is transferred to the water. In the case "a", however, the energy of the ultrasonic waves is not transferred to the water. Thus, the signals gradually attenuate in the ultrasonic probes 205a, 205b and 205c. In FIG. 5, "b" indicates a case in which a water level is lower than a reflective plate 209b. Since most of ultrasonic waves within the cases of the ultrasonic probes 205a, 205b and 205c are transmitted into the water, the amplitudes of signals in the case "b" are smaller than the amplitude of the signal in the case "a". After the amplitudes are reduced, waves reflected from the surfaces of the water reach the ultrasonic probes 205a, 205b and 205c. In FIG. 5, "c" indicates a case in which the water level is the same as the vertical position of the reflective plate 209b. Since the amplitude of a wave reflected from the surface of the water is larger than the amplitude of a wave reflected from the reflective plate 209b, the amplitude of the wave reflected from the reflective plate 209b is hidden and cannot be viewed. In FIG. 5, "d" indicates a case in which the water levels are higher than the reflective plate 209b and lower than the upper end portion of the water level measurement tubes 200a, 200b and 200c. Waves reflected from the reflective plates 209a, 209b and 209c can be distinguished from waves reflected from the surfaces of the water since the amplitudes of the waves reflected from the reflective plates 209a, 209b and 209c are different from the amplitudes of the waves reflected from the surfaces of the water. In FIG. 5, "e" indicates a case in which the water level measurement tubes 200a, 200b and 200c are filled with the water. The amplitudes of waves reflected from the upper end portions of the water level measurement tubes 200a, 200b and 200c are larger than the amplitudes of waves reflected from the reflective plates 209a, 209b and 209c. Differences between times when the electric pulse signals are applied and times when the reflected waves are received correspond to differences between times when the electric pulse signals are applied and times when the waves reflected from the upper end portions of the water level measurement tubes 200a, 200b and 200c are received. Thus, the reflected waves can be identified.

Incidentally, the soundness of an operation of the ultrasonic reactor water level measuring device according to the invention can be evaluated from a central control room. Specifically, echoes (illustrated in FIG. 5) of the ultrasonic probes 205a, 205b and 205c are used for the evaluation. The soundness can be evaluated by applying the electric pulse signals from the ultrasonic transducers 206a, 206b and 206c and monitoring the echoes of the ultrasonic probes 205a, 205b and 205c. If at least one of signal lines that connect the ultrasonic transducers 206a, 206b and 206c to the ultrasonic probes 205a, 205b and 205c is broken, such echoes as illustrated in FIG. 5 hardly appear. If at least one of the signal lines is short-circuited, the ultrasonic transducers 206a, 206b and 206 may be overloaded or an echo may not be confirmed. In such a case, it is apparent that the ultrasonic reactor water level measuring device is not sound. The water level calculation display 208 has a function of evaluating the soundness. Specifically, in a soundness evaluation mode, the water level calculation display 208 uses the ultrasonic transducers 206a, 206b and 206c and compares echo waveforms obtained in the soundness evaluation mode with echo waveforms stored when the ultrasonic reactor water level measuring device is sound. Then, the water level calculation display 208 evaluates the soundness of the ultrasonic reactor water level measuring device.

According to the first embodiment, the following effects can be obtained.

(1) Since the water level measurement tubes are arranged at the multiple stages, the lengths of the water level measurement tubes are small. Required accuracy of the parallelism of the surfaces of the water and surfaces on which the ultrasonic probes are arranged can be easily managed. Thus, an effect of improving the performance of the ultrasonic reactor water level measuring device is obtained.

(2) Since the reflectance of the reflective plate 209b illustrated in FIG. 4 can be adjusted, the wave reflected from the reflective plate 209b and the wave reflected from the liquid surface or the upper end portion of the water level measurement tube can be easily identified. Thus, an effect of improving the reliability of a result of the evaluation of the soundness is obtained.

(3) Ultrasonic wave components that propagate on walls of the water level measurement tubes can be reduced by welding the ultrasonic probes and the flanges together and unifying them compared with a method in which the ultrasonic probes are attached to the bottom portions of the water level measurement tubes through couplants. As a result, noise can be reduced.

(4) An effect of improving the reliability of the ultrasonic reactor water level measuring device is obtained by evaluating the soundness using an echo.

(5) Since a standard water level is not required unlike a differential-pressure method and the soundness can be evaluated before use of the ultrasonic reactor water level measuring device, an effect of improving the efficiency of measuring the water level is obtained.

(6) Since the main part of the ultrasonic reactor water level measuring device is arranged outside the storage vessel, a person can approach the ultrasonic reactor water level measuring device even when the reactor operates. Thus, an effect of improving maintenance of the ultrasonic reactor water level measuring device is obtained.

(7) Since the sound speed is corrected using periods of time for ultrasonic waves to reciprocate between the ultrasonic probes and the reflective plates, the responsiveness of the correction of the sound speed and the accuracy of the correction can be improved, compared with a case in which the sound speed is corrected using a temperature meter such as a thermocouple. The responsiveness can be achieved since propagation times of the ultrasonic waves are short. While a temperature sensor measures the temperature of a point in general, the accuracy of the correction can be improved since linear information of the speed of the sound in the propagation path is used in the method using the ultrasonic waves.

(8) The tubes including the connection tubes 204a and 204b that connect the water level measurement tubes to the pressure vessel are inclined and configured so that the upper portions of the tubes are located on gas phase sides and air bubbles in the liquids are not stored in the measurement tubes. Thus, an adverse effect of the measurement of the water level due to the presence of the air bubbles is suppressed and the reliability of the measurement of the water level is improved. Specifically, an error of the measurement of the water level due to storage of air bubbles in the upper end portions of the water level measurement tubes is suppressed. In addition, since air bubbles easily move out of the liquids, an effect of suppressing attenuation of propagation of ultrasonic waves in the liquids can be expected.

In the present embodiment, the ultrasonic probes 205a, 205b and 205c are attached to the flanges by welding. The attachment is to maintain reliable pressure boundaries since pressure and temperatures are high. If requirements for the pressure and temperatures are eased, the ultrasonic probes may be attached by brazing, an adhesive, a metal seal or the like.

Second Embodiment

When the ultrasonic waves are transmitted into the measurement tubes, a part of the ultrasonic waves may propagate onto a tube wall and be scattered and mixed with a wave reflected from the liquid surface and may reduce a temporal resolution of the measurement of the period of time for the wave reflected from the liquid surface to reach the ultrasonic probe.

Figure 6:
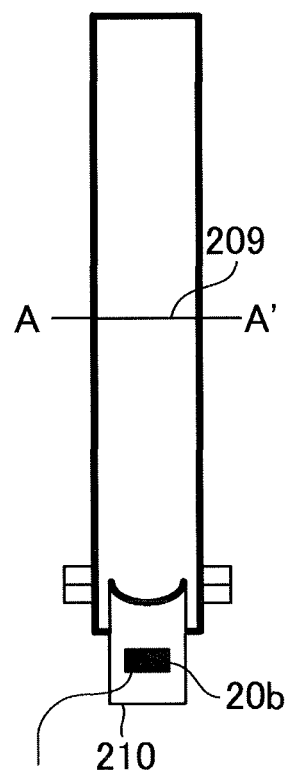
FIG. 6 is a cross-sectional view of a measurement tube to which an ultrasonic probe having a lens on a surface from which an ultrasonic wave is transmitted is attached according to a second embodiment of the invention.

To avoid this, ultrasonic probes 210 that each have a lens with a concave surface may be used as illustrated in FIG. 6. The concave surfaces can suppress the spread of ultrasonic beams transmitted by the ultrasonic probes 210 and reduce noise. The concave surfaces are in contact with the water.

The following effects can be obtained in the second embodiment.

Since noise can be reduced by using the ultrasonic lenses in the ultrasonic reactor water level measuring device, the accuracy of the measurement of the water level can be improved. Thus, an effect of improving the performance of the ultrasonic reactor water level measuring device is obtained.

The first and second embodiments are described above. In the embodiments, the measurement tubes are arranged outside the storage vessel. However, it is not essential to arrange the measurement tubes outside the storage vessel according to the invention. The measurement tubes may be arranged in the storage vessel when necessary, although advantages that a person can approach the measurement tubes during an operation of the reactor and the like cannot be expected.

What is claimed is:

1. An ultrasonic reactor water level measuring device comprising:
    an upper tube that extends from a gas phase portion in a reactor;
    a lower tube that extends from a liquid phase portion in the reactor;
    measurement tubes that are connected to each other and arranged at multiple stages between the upper tube and the lower tube; and
    units for generating and receiving ultrasonic waves and measuring levels of water within the measurement tubes, the units being arranged at bottom portions of the measurement tubes,
    wherein a water level within the reactor is calculated from the sum of the measured water levels, the sum excluding the height of an overlapped part of the measurement tubes.

2. The ultrasonic reactor water level measuring device according to claim 1, further comprising
    separation valves that are arranged in the middle of the upper and lower tubes,
    wherein when pressure on the side of the measurement tubes is equal to or lower than a set value, the separation valves are automatically closed.

3. The ultrasonic reactor water level measuring device according to claim 1,
    wherein ultrasonic probes are directly in contact with the water and integrated with flanges so that transmittances of the ultrasonic waves in the water are high, compared with a conventional method using an acoustic couplant.

4. The ultrasonic reactor water level measuring device according to claim 1, further comprising
    reflective plates that are arranged in the middle of the measurement tubes,
    wherein the temperature and pressure of the water are corrected on the basis of ratios of periods of time for waves reflected from surfaces of the water or upper end portions of the measurement tubes to propagate from the surfaces of the water or the upper end portions of the measurement tubes to the generating/receiving units to periods of time for waves reflected from the reflective plates to propagate from the reflective plates to the generating/receiving units.

5. The ultrasonic reactor water level measuring device according to claim 4, wherein the reflective plates have reflection intensities that can be adjusted by adjusting diameters of holes of central portions of the measurement tubes or the areas of constituent members of the measurement tubes.

6. The ultrasonic reactor water level measuring device according to claim 1, further comprising
a temperature sensor that is arranged in at least one of the measurement tubes,
wherein a sound speed is determined using a temperature instruction value for the temperature of the water within the measurement tube, and the temperature of the water is corrected on the basis of the sound speed and a time period in which the ultrasonic wave that propagates to the liquid surface or the upper end portion of the measurement tube reciprocates.

7. The ultrasonic reactor water level measuring device according to claim 1,
wherein connection tubes and the upper and lower tubes that connect the pressure vessel to the measurement tubes are inclined so that gas-phase-side end portions of the connection tubes are higher than the other end portions of the connection tubes, gas-phase-side end portions of the upper and lower tubes are higher than the other end portions of the upper and lower tubes, and air bubbles are not stored in the connection tubes and the upper and lower tubes.

* * * * *